(12) United States Patent
Keil et al.

(10) Patent No.: US 6,382,372 B1
(45) Date of Patent: May 7, 2002

(54) PORTED DISC VARIABLE BLEED ORIFICE

(75) Inventors: Daniel Keil; Karl Kazmirski, both of Toledo, OH (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/476,281

(22) Filed: Jan. 3, 2000

(51) Int. Cl.$^7$ .................................................. F16F 9/34
(52) U.S. Cl. ............................. 188/322.15; 188/322.14
(58) Field of Search ........................ 188/322.15, 322.14, 188/322.13, 322.22; 267/64.12, 64.13, 64.14, 64.26

(56) References Cited

U.S. PATENT DOCUMENTS

| | | |
|---|---|---|
| 2,732,039 A | 1/1956 | Funkhouser et al. ... 188/322.15 |
| 4,060,155 A | 11/1977 | Duckett |
| 4,401,196 A | 8/1983 | Grundei |
| 4,460,074 A  * | 7/1984 | Muller et al. .......... 188/322.14 |
| 4,484,669 A | 11/1984 | Kato |
| 4,610,332 A | 9/1986 | Mourray |
| 4,834,222 A | 5/1989 | Kato et al. |
| 4,895,229 A | 1/1990 | Kato |
| 4,901,828 A  * | 2/1990 | Schmidt et al. ..... 188/322.15 X |
| 4,972,929 A | 11/1990 | Ivers et al. |
| 5,064,032 A  * | 11/1991 | Ashiba .............. 188/322.15 X |
| 5,129,488 A | 7/1992 | Furuya et al. |
| 5,316,113 A | 5/1994 | Yamaoka |
| 5,325,942 A | 7/1994 | Groves et al. |
| 5,332,069 A | 7/1994 | Murakami |
| 5,333,708 A  * | 8/1994 | Jensen et al. .......... 188/322.14 |
| 5,413,195 A | 5/1995 | Murakami |
| 5,615,756 A | 4/1997 | Grundei et al. |
| 5,769,190 A | 6/1998 | Deferme |
| 5,823,306 A | 10/1998 | de Molina |
| 5,967,268 A  * | 10/1999 | de Molina et al. .......... 188/277 |

* cited by examiner

Primary Examiner—Pam Rodriguez
(74) Attorney, Agent, or Firm—Harness, Dickey & Pierce, PLC

(57) ABSTRACT

A shock absorber includes a valve assembly with a low speed oil flow circuit and a mid/high speed oil flow circuit. Both circuits control fluid flow through the valve assembly in the same direction. The low speed oil flow circuit is tunable in order to provide low speed damping to improve both the vehicle control and handling. The tuning of the low speed oil flow circuit is accomplished by sizing a restricted passage which is part of a circuit and controlling the pressure at which the low speed oil flow circuit opens. The valve assembly of the present invention can be located within either a base valve assembly or a piston valve assembly.

7 Claims, 4 Drawing Sheets

PORTED DISC VARIABLE BLEED ORIFICE

FIELD OF THE INVENTION

The present invention relates generally to automotive dampers or shock absorbers which receive mechanical shock. More particularly, the present invention relates to a unique hydraulic valve assembly which allows greater tunability of the shock absorber, especially in the mode of low hydraulic fluid flow.

BACKGROUND OF THE INVENTION

Shock absorbers are used in conjunction with automotive suspension systems to absorb unwanted vibrations which occur during driving. To absorb unwanted vibrations, shock absorbers are generally connected between the sprung portion(body) and the unsprung portion (suspension) of the automobile. A piston is located within a pressure tube of the shock absorber and is connected to the sprung portion of the automobile through a piston rod. The piston divides the pressure tube into an upper working chamber and a lower working chamber. Because the piston is able, through valving, to limit the flow of damping fluid between the upper and lower working chambers when the shock absorber is compressed or extended, the shock absorber is able to produce a damping force which counteracts the vibration which would otherwise be transmitted from the unsprung portion to the sprung portion of the automobile. In a dual tube shock absorber, a fluid reservoir is defined between the pressure tube and the reservoir tube. A base valve is located between the lower working chamber and the reservoir to limit the flow of fluid between the lower working chamber and the reservoir to produce a damping force which also counteracts the vibration which would otherwise be transmitted from the unsprung portion to the sprung portion of the automobile. The greater the degree to which the flow of fluid within the shock absorber is restricted by the piston valving or the base valve, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant of the main springs of the vehicle as well as the spring constant of the seat, tires and the damping coefficient of the shock absorber. For optimum ride comfort, a relatively low damping force or a soft ride is preferred. Vehicle handling is related to the variation in the vehicle's attitude (i.e. roll, pitch and yaw). For optimum vehicle handling, relatively large damping forces or a firm ride are required to avoid excessively rapid variations in the vehicle's attitude during cornering, acceleration and deceleration. Road holding ability is generally a function of the amount of contact between the tires and the ground. To optimize road handling ability, large damping forces are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending on the speed at which the piston moves within the pressure tube. Because of the exponential relation between pressure drop and flow rate for a fixed orifice, it is difficult to obtain damping force at low piston rod velocities, particularly at velocities near zero. Low speed damping force is important to vehicle handling since most vehicle handling events are controlled by low speed body velocities.

One known method for tuning shock absorbers during low speed movement of the piston is to create the low speed bleed orifice by utilizing open orifice notches positioned either on the flexible disc adjacent to the sealing land or in the sealing land itself. The configuration of these open orifices is therefore constant and is not a function of the internal pressures. To obtain the low speed control utilizing these open orifice notches, the orifice notches have to be small enough to create the orifice restriction at low velocities. When this is accomplished, the low speed circuit of the valving system operates over a very small range of velocity, therefore the second stage valving is activated at a relatively low velocity. Activation of the second valving stage at relatively low velocities creates harshness because of the shape of the fixed orifice bleed circuit force velocity characteristic which is much different in configuration than the shape of the mid-speed circuit.

Prior art attempts at limiting harshness during low speed piston movements have included the incorporation of a variable orifice bleed valving circuit. As the velocity of the piston increases, the flow area of the variable orifice bleed disc increases. The prior art variable orifice bleed valving orifice area is opened by the outside diameter of the valving disc. Thus, the diameter of the disc determines the rate at which the flow area increases. As the diameter of the disc increases, it becomes difficult to control the rate at which the flow area of the orifice increases. The flow area is increased by the deflection of the variable orifice bleed disc. Small deflection of the large diameter variable orifice bleed discs provides a rapid increase in the flow area of the bleed orifice. The rapid increase in the flow area complicates the tuning between the low speed valving circuit and the secondary circuit.

Continued development of shock absorbers include the development of a valving system which can smooth the transition between the low speed valving system and the second stage valving system in order to reduce and/or eliminate the harshness during the transition.

SUMMARY OF THE INVENTION

The present invention provides the art with a method for tuning damping forces at low piston velocities in an effort to improve the handling characteristics of the vehicle without creating harshness. The present invention provides a ported disc variable orifice bleed circuit which incorporates a pressure sensitive orifice that is located down stream from three fixed orifices radially located in the ported restriction disc. Once hydraulic fluid flows through the fixed orifice, it flows into three pressure areas in the same disc. These pressure areas provide the hydraulic fluid with a means of acting on the variable orifice bleed circuit. The size of the pressure area and the preload on the low speed disc dictate the pressure needed to open the low speed disc. This feature provides the necessary tunability for the present invention.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

RETAILED DESCRIPTION OF THE PREFERRED EMBODIMENT

Figure 1:
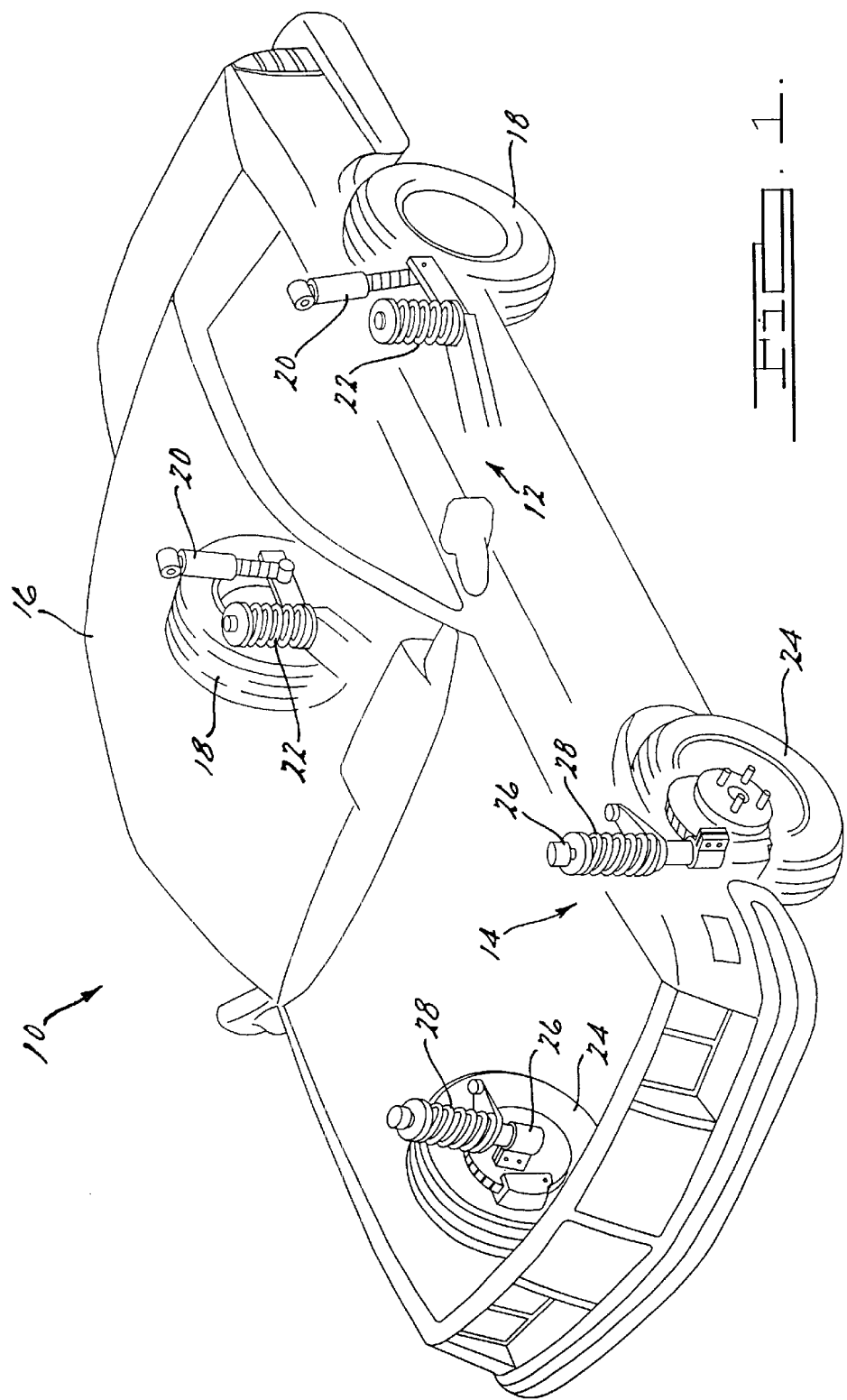
FIG. 1 is an illustration of an automobile using the ported disc variable bleed orifice in accordance with the present invention.

Referring now to the drawings in which like reference numerals designate like or corresponding parts throughout the several views, there is shown in FIG. 1 a vehicle incorporating a suspension system having the ported disc variable bleed orifice in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
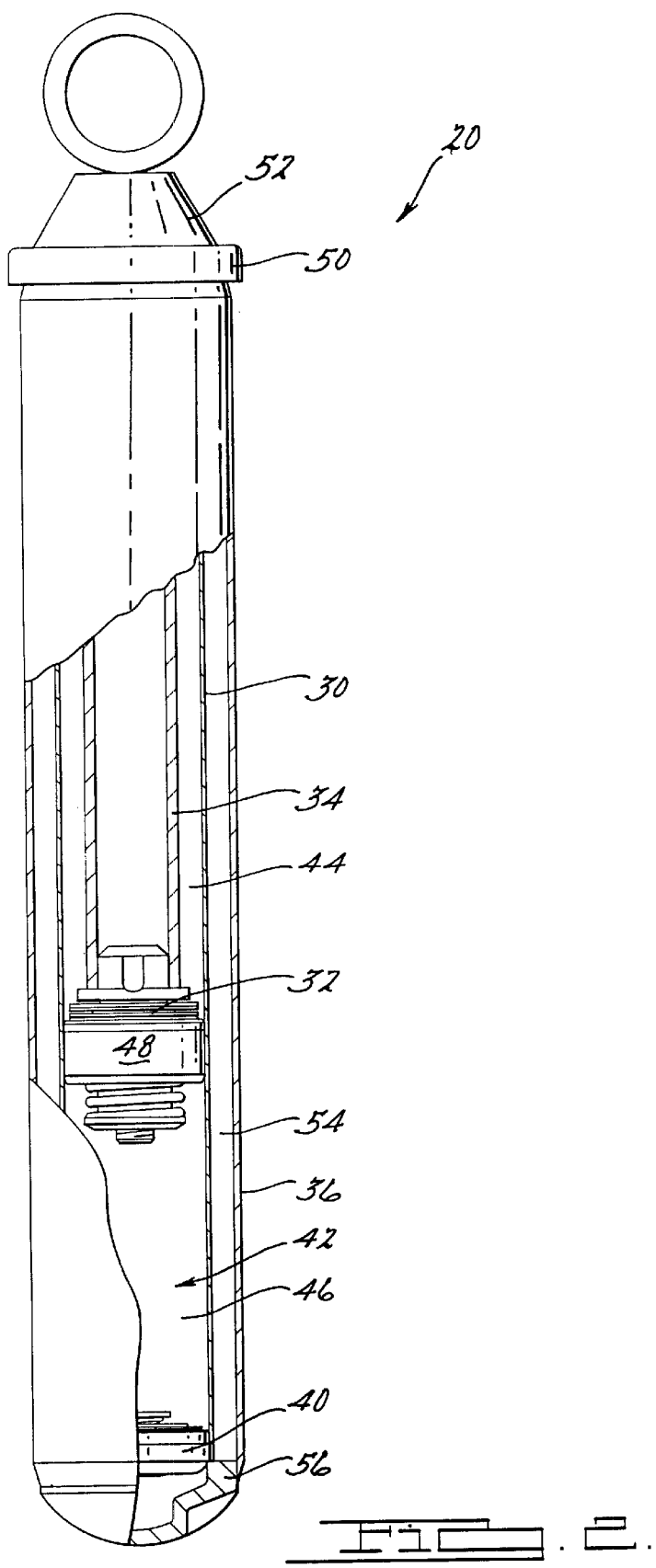
FIG. 2 is a side view, partially in cross section, of a shock absorber incorporating the ported disc variable bleed orifice in accordance with the present invention.

Referring now to FIG. 2, shock absorber 20 is shown in greater detail. While FIG. 2 shows only shock absorber 20, it is to be understood that shock absorber 26 also includes the piston and base valving described below for shock absorber 20. Shock absorber 26 differs from shock absorber 20 in the way in which it is adapted to be connected to the sprung and unsprung portions of vehicle 10. Shock absorber 20 comprises a pressure tube 30, a piston 32, a piston rod 34, a reservoir tube 36 and a base valve assembly 40.

Pressure tube 30 defines a working chamber 42. Piston 32 is slidably disposed within pressure tube 30 and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston 32 is adapted, in the preferred embodiment, to be secured to the sprung portion of vehicle 10. Valving within piston 32 controls the movement of fluid between upper working chamber 44 and lower working chamber 46 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base valve assembly 40.

Reservoir tube 36 surrounds pressure tube 30 to define a reservoir chamber 54 located between the tubes. The bottom end of reservoir tube 36 is closed by an end cap 56 which is adapted, in the preferred embodiment, to be connected to the unsprung portion of vehicle 10. The upper end of reservoir tube 36 is attached to upper end cap 50. Base valve assembly 40 is disposed between lower working chamber 46 and reservoir chamber 54 to control the flow of fluid between the two chambers. When shock absorber 20 extends in length (rebound), an additional volume of fluid is needed in lower working chamber 46 due to the "rod volume" concept. Thus, fluid will flow from reservoir chamber 54 to lower working chamber 46 through base valve assembly 40. When shock absorber 20 compresses in length (compression), an excess volume of fluid must be removed from lower working chamber 46 due to the "rod volume" concept. Thus fluid will flow from lower working chamber 46 to reservoir chamber 54 through base valve assembly 40.

The present invention is directed to the unique base valve assembly 40 which includes a ported disc variable bleed orifice. Base valve assembly 40 provides a tunable smooth transition between the low speed compression valving and the second stage of compression valving which comes into play during mid and high speed piston movements.

Figure 3:
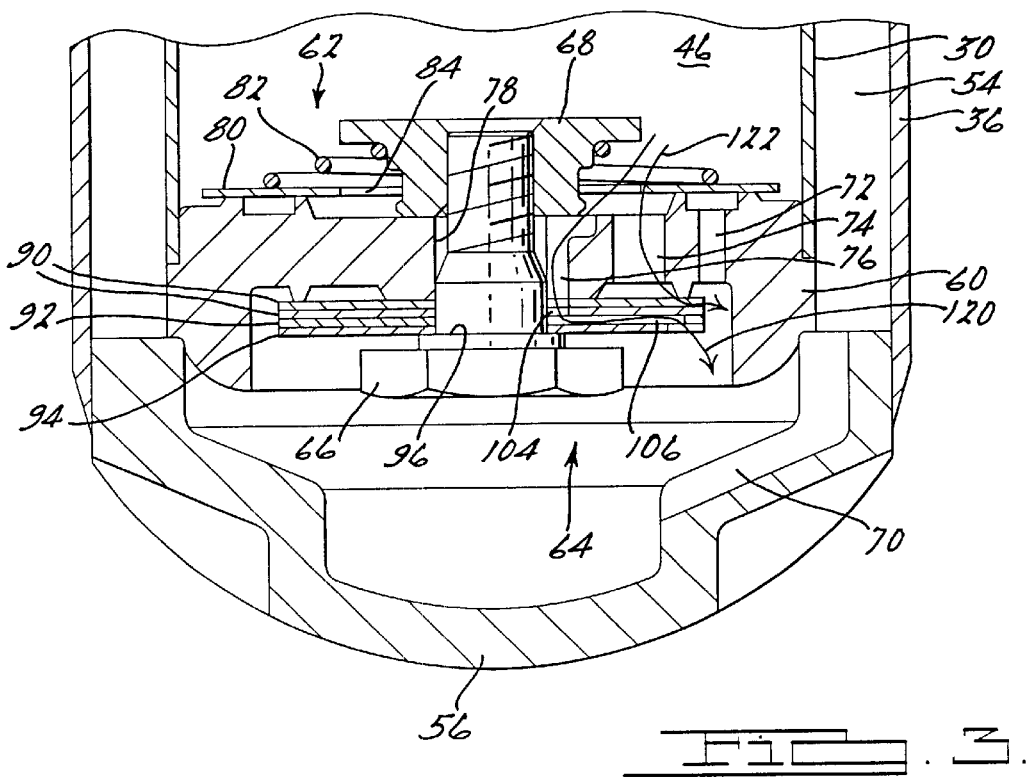
FIG. 3 is an enlarged side elevational view, partially in cross section, of the base valve portion of the shock absorber shown in FIG. 2.

Referring now to FIG. 3, base valve assembly 40 comprises a valve body 60, an intake valve assembly 62, a compression valve assembly 64, a retaining bolt 66 and a retaining nut 68. Valve body 60 is secured to pressure tube 30 and end cap 56 by press fitting or by other methods known well in the art. End cap 56 is secured to reservoir tube 36 and it defines a plurality of fluid passages 70 which allow communication between reservoir chamber 54 and base valve assembly 40. Valve body 60 defines; a plurality of intake fluid passages 72, a plurality of mid/high speed compression passages 74, a plurality of low speed compression passages 76 and a central bore 78. Retaining bolt 66 extends through central bore 78 and threadingly engages retaining nut 68 to secure both intake valve assembly 62 and compression valve assembly 64 to valve body 60.

Intake valve assembly 62 comprises a valve disc 80 and a valve spring 82. Valve disc 80 is an annular member which defines an internal bore 84 for allowing fluid flow to compression passages 74 and 76 as described below. Valve disc 80 is biased against the upper surface of valve body 60 by valve spring 82 which is located between valve disc 80 and retaining nut 68. Valve disc 80 closes the plurality of intake fluid passages 72. During a rebound stroke of shock absorber 20, fluid pressure decreases in lower working chamber 46 until the fluid pressure within reservoir chamber 54 and intake fluid passages 72 is capable of overcoming the biasing force of valve spring 82. When the biasing force exerted by valve spring 82 is exceeded by fluid pressure acting against valve disc 80, valve disc 80 is moved away from valve body 60 to allow fluid flow from reservoir chamber 54 to lower working chamber 46.

Figure 4:
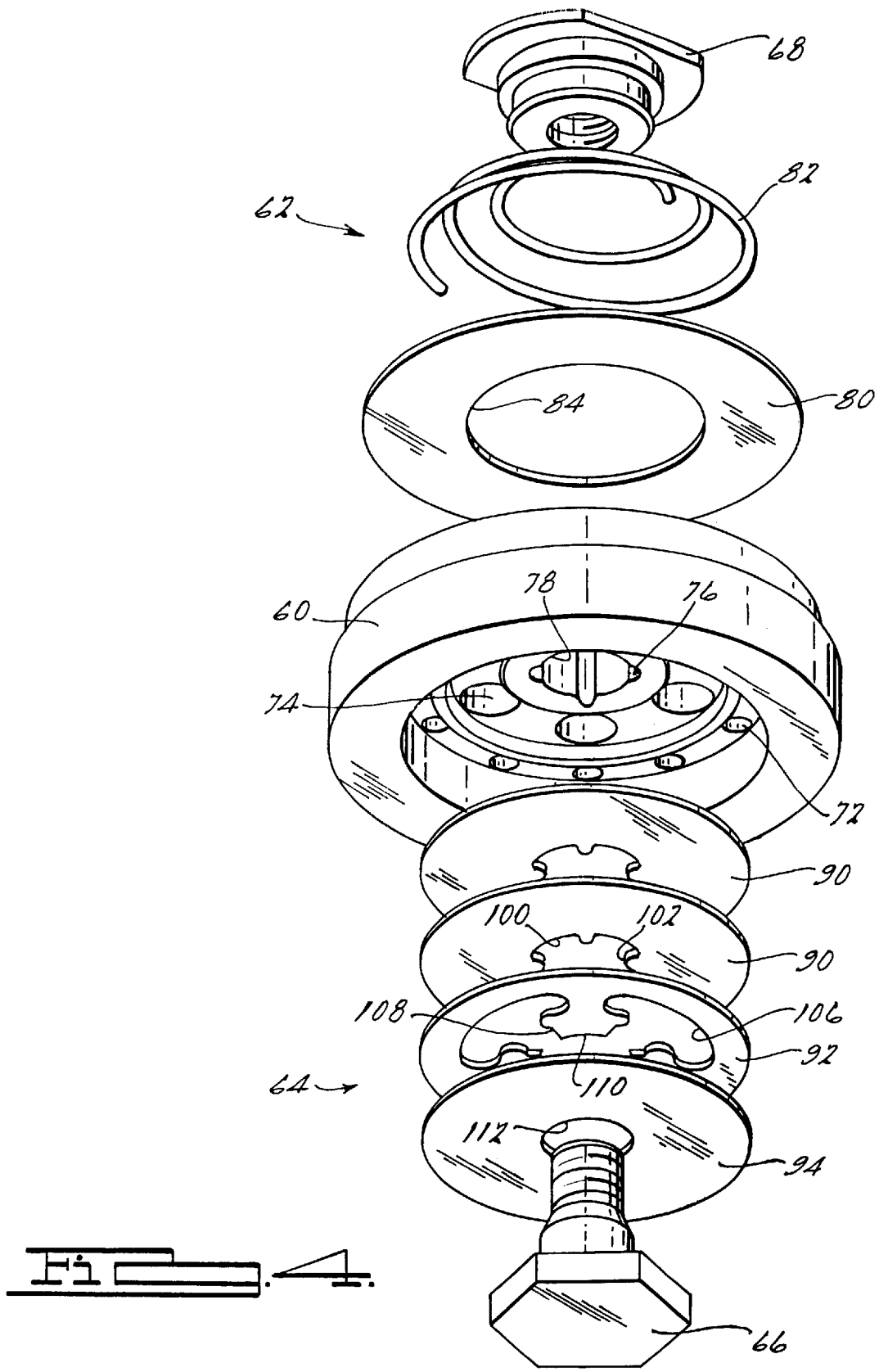
FIG. 4 is an exploded perspective view of the base valve shown in FIG. 3.

Referring now to FIGS. 3 and 4, compression valve assembly 64 comprises one or more mid/high speed valve discs 90, one ported restriction discs 92 and one or more variable orifice bleed discs 94. Discs 90, 92 and 94 are stacked together and located adjacent to valve body 60 with mid/high speed valve disc 90 abutting valve body 60, ported restriction disc 92 abutting mid/high speed valve disc 90 and variable orifice bleed disc 94 abutting ported restriction disc 92. Discs 90, 92 and 94 are held in position by being sandwiched between a shoulder 96 located on retaining bolt 66 and the lower surface of valve body 60. Retaining bolt 66 is secured to valve body 60 by retaining nut 68.

Each mid/high speed valve disc 90 is an annular disc defining a central bore 100 and a plurality of tabs 102 which extend radially into central bore 100. The plurality of tabs 102 center disc 90 on retaining bolt 66 and with retaining bolt 66 define a plurality of low speed oil flow passages 104.

Each ported restriction disc 92 is an annular disc defining a plurality of pockets 106, a plurality of restricted passages 108 and a central bore 110. Central bore 110 centers disc 92 on retaining bolt 66. The plurality of restricted passages 108 receive hydraulic fluid from the plurality of passages 104 and direct this fluid flow into the plurality of pockets 106. The width of passages 108 is one of the design criteria which can be used to tune the performance for shock absorber 20. The size of passages 108 control the velocity at which the mid-speed fluid circuit of the shock absorber becomes active as is detailed below.

Each variable bleed disc 94 is an annular disc having a central bore 112. Central bore 112 centers bleed disc 94 on retaining bolt 66. Disc 94 covers disc 92 and thus closes the plurality of pockets 106. When fluid pressure builds up in pockets 106, disc 94 will flex allowing a bleed flow of fluid past disc 94.

During a compression stroke, fluid pressure increases in lower working chamber 46 causing a fluid pressure decrease in upper working chamber 44 causing a pressure imbalance between lower working chamber 46 and reservoir chamber 54. This pressure imbalance will cause fluid flow to begin through the low speed oil flow circuit identified by arrow 120 in FIG. 3. Fluid flows from lower working chamber 46, through internal bore 84, through low speed passages 76 in valve body 60, through low speed passages 104 in discs 90, through restricted passages 108 in discs 92 and into closed pockets 106 of discs 92. Pockets 106 are closed due to discs 90 and 94 abutting opposing sides of disc 92. Fluid pressure builds up in pockets 106 until such a time that the fluid pressure in pockets 106 acts against valve disc 94 and overcome the load necessary to deflect disc 94 and allow fluid flow between pockets 106 and reservoir chamber 54. The maximum flow rate through low speed oil flow circuit 120 is controlled by the size of passages 108. Passages 108 control the velocity at which shock absorber 20 will switch between the low speed oil flow circuit 120 and the mid/high speed circuit depicted by arrows 122 in FIG. 3. Fluid pressure in pockets 106 control the force that is applied to disc 94. This force in conjunction with the preload acting against discs 90, 92 and 94 will dictate the pressure required to deflect disc 94 and allow fluid flow from pockets 106 to reservoir chamber 54. Once passages 108 are saturated by fluid flow rate, fluid pressure builds up in the plurality of mid/high speed fluid passages 74 until the pressure acting against the mid/high speed valve discs 90 overcomes the load required to deflect discs 90 and allow fluid flow from passages 74 to reservoir chamber 54 as shown by arrows 122.

Thus, the present invention provides increased low speed damping force which enhances vehicle control. Vehicle handling is improved as a result of transferring the inertia of the vehicle to a force applying the tire to the road. Prior art designs cannot transfer vehicle body inertia to the tire because a damping force is not created at low body velocities due to the fixed bleed orifices or notches. The present invention is a distinct advantage over the prior art systems since, saturation of low speed valving circuit 120 is a tunable feature. Another advantage of the present invention over the prior art is that the maximum orifice area in circuit 120 is not dictated by disc deflection but rather by the size of passages 108. This feature is extremely important for valving systems which have valve discs of a large diameter since these prior art large diameter discs open a significant orifice area for small disc deflections.

Figure 5:
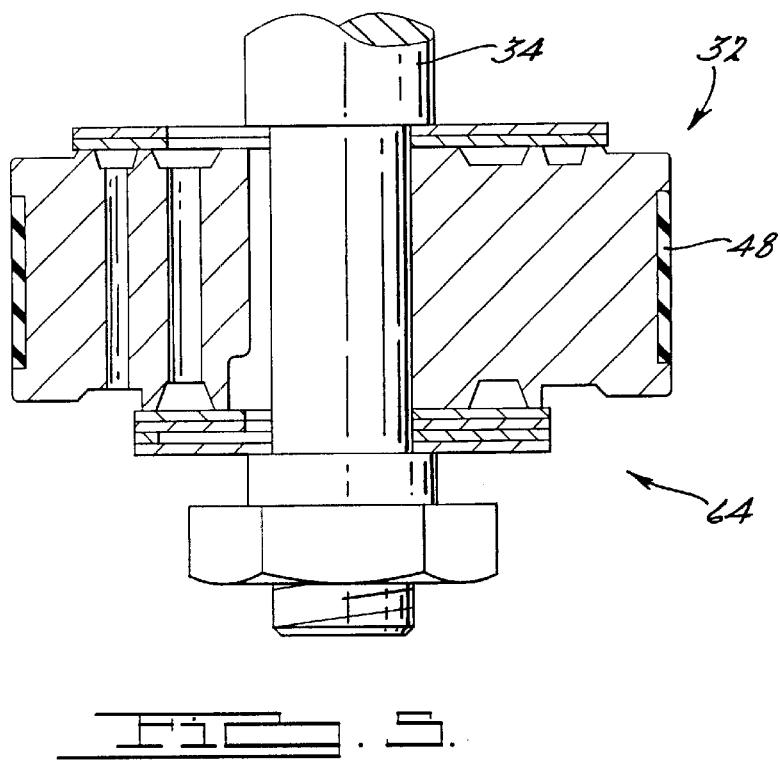
FIG. 5 is an enlarged side elevational view, partially in cross section, of a piston valve incorporating the ported disc variable bleed orifice according to the present invention.

While the present invention has been illustrated in conjunction with base valve assembly 40, it is within the scope of the present invention to incorporate valve assembly 64 on the rebound side of base valve assembly 40. Also, it is within the scope of the present invention, as shown in FIG. 5, to incorporate valve assembly 64 on piston 32 if desired. While FIG. 5 illustrates valve assembly 64 on the rebound side of piston 32, it is within the scope of the present invention to incorporate valve assembly 64 on the compression side of piston 32 if desired.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
   a pressure tube forming a working chamber;
   a reservoir tube disposed around said pressure tube, said reservoir tube forming a reservoir chamber between said pressure tube and said reservoir tube;
   a base valve assembly disposed between said working chamber and said reservoir chamber for regulating flow of damping fluid between said reservoir chamber and said working chamber, said base valve assembly comprising:
   a low speed valve movable between a closed position and an open position in response to a first fluid pressure differential between fluid pressure within said working chamber and fluid pressure within said reservoir chamber;
   a mid/high speed valve movable between a closed position and an open position in response to a second fluid pressure differential between said fluid pressure within said working chamber and said fluid pressure within said reservoir chamber, said second fluid pressure differential being greater than said first fluid pressure differential, each of said low speed valve and said mid/high speed valve allowing and regulating said flow of said damping fluid in a first direction through said base valve assembly;
   a valve body defining a low speed oil passage and a mid/high speed oil passage;
   a mid/high speed disc abutting said valve body, said mid/high speed disc closing said mid/high speed oil passage;
   a ported restriction disc abutting said mid/high speed disc, said ported restriction disc having a restricted passage in communication with said low speed oil passage;
   a variable orifice bleed disc abutting said ported restriction disc, said variable orifice bleed disc closing said restricted passage; and a pressure valve movable between a closed position and an open position, said pressure valve regulating said flow of said damping fluid in a second direction through said base valve assembly, said second direction being opposite to said first direction.

2. The damper according to claim 1, further comprising a piston disposed within said working chamber, said piston dividing said working chamber into an upper portion and a lower portion, said base valve assembly being disposed between said lower portion of said working chamber and said reservoir chamber.

3. The damper according to claim 1, wherein said ported restriction disc includes a pocket in communication with said restricted passage.

4. The damper according to claim 3, wherein said variable bleed disc closes said pocket.

5. A damper comprising:

a pressure tube forming a working chamber;

a piston disposed within said working chamber, said piston dividing said working chamber into an upper working chamber and a lower working chamber;

a piston valve assembly attached to said piston for regulating flow of damping fluid between said upper working chamber and said lower working chamber, said piston valve assembly comprising:

a low speed valve movable between a closed position and an open position in response to a first fluid pressure differential between fluid pressure within said upper working chamber and fluid pressure within said lower working chamber;

a mid/high speed valve movable between a closed position and an open position in response to a second fluid pressure differential between said fluid pressure within said upper working chamber and said fluid pressure within said lower working chamber, said second fluid pressure differential being greater than said first fluid pressure differential, each of said low speed valve and said mid/high speed valve allowing and regulating said flow of said damping fluid in a first direction through said piston valve assembly;

a valve body defining a low speed oil passage and a mid/high speed oil passage;

a mid/high speed disc abutting said valve body, said mid/high speed disc closing said mid/high speed oil passage;

a ported restriction disc abutting said mid/high speed disc, said ported restriction disc having a restricted passage in communication with said low speed oil passage;

a variable orifice bleed disc abutting said ported restriction disc, said variable orifice bleed disc closing said restricted passage; and a pressure valve movable between a closed position and an open position, said pressure valve regulating said flow of said damping fluid in a second direction through said piston valve assembly, said second direction being opposite to said first direction.

6. The damper according to claim 5, wherein said ported restriction disc includes a pocket in communication with said restricted passage.

7. The damper according to claim 6, wherein said variable bleed disc closes said pocket.

* * * * *